(No Model.) 2 Sheets—Sheet 2.

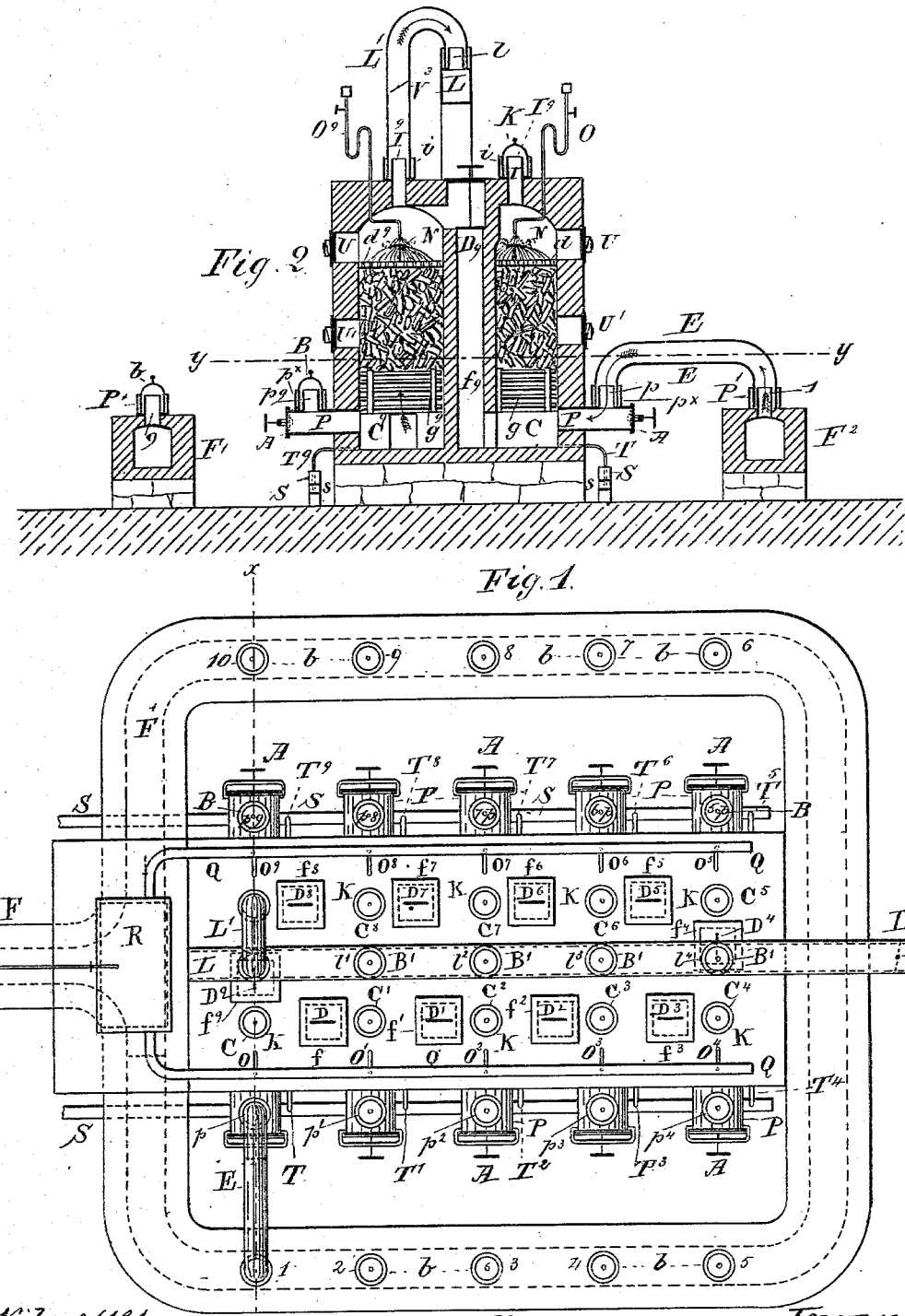

C. W. FLODQUIST.
APPARATUS FOR THE TREATMENT OF BONES, PHOSPHATIC RESIDUES, &c.

No. 301,708. Patented July 8, 1884.

Witnesses
Inventor
Carl W. Flodquist

UNITED STATES PATENT OFFICE.

CARL WALDEMAR FLODQUIST, OF MOLNDAHL, SWEDEN.

APPARATUS FOR THE TREATMENT OF BONES, PHOSPHATIC RESIDUES, &c.

SPECIFICATION forming part of Letters Patent No. 301,708, dated July 8, 1884.

Application filed October 17, 1883. (No model.)

*To all whom it may concern:*

Be it known that I, CARL WALDEMAR FLODQUIST, a citizen of the Kingdom of Sweden, residing at Molndahl, in Sweden, have invented certain new and useful Improvements in the Art of Manufacturing Glue, Phosphate of Lime, Sulphites, and Aqueous Solutions of Sulphurous Acid, and Apparatus Therefor; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to provide a suitable apparatus for treating bones, whereby various products may be obtained—as, for instance, glue, phosphate and sulphite of lime, sulphites, or aqueous solutions of sulphurous acid. If the apparatus is employed for manufacturing glue, the apparatus is charged with bones previously freed from fat and sulphurous acid, and in this manufacture aqueous solutions of acid phosphate and acid sulphite are obtained as secondary products. If the primary product is to be an aqueous solution of a sulphite or of sulphurous acid, sulphurous acid and coke or its equivalent are employed. The apparatus is charged with the latter material, and if sulphites are to be obtained is sprinkled with a suitable solution—such, for instance, as a solution of soda—and if sulphurous acid solutions are to be obtained, with water. In the manufacture of glue, by charging the apparatus with bones freed from fat and with carbonate of lime, and subjecting them to the action of sulphurous acid, solutions of acid phosphate and acid sulphite of lime as secondary products are obtained that may be employed with advantage in the manufacture of paper-pulp from fibrous substances, such as wood, sawdust, straw, &c.

As an illustration of the function of the apparatus, I will describe the same when operating to produce the last-named products, referring to the accompanying two sheets of drawings, in which—

Figure 3:
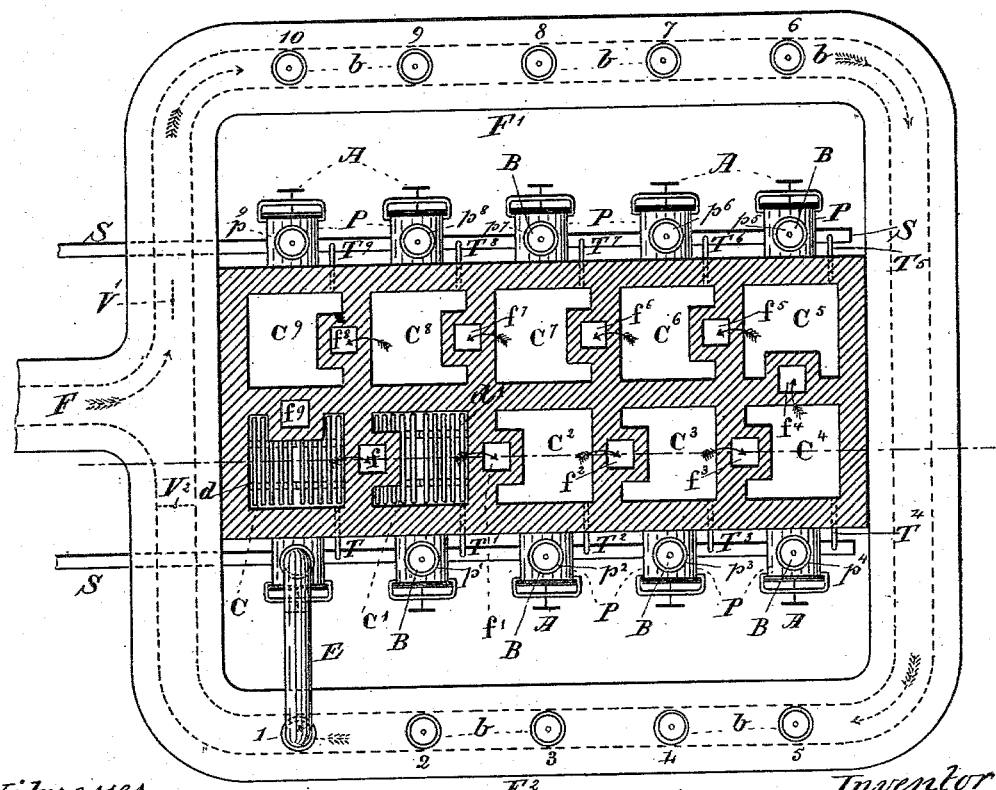

Figure 1 is a top plan view; Fig. 2, a vertical transverse section on line $x\,x$ of Fig. 1; Fig. 3, a like horizontal section on line $y\,y$ of Figs. 2 and 4; and Fig. 4 is a side elevation, partly in section, of my improved apparatus or plant.

Like letters of reference indicate like parts wherever such may occur in the above figures of drawings.

Sulphurous acid is or may be obtained from sulphur, or preferably from sulphur and pyrites burned together, but in separate chambers, in a furnace of any usual or preferred construction, from which the combined gases pass to a suitable refrigerating or cooling apparatus. As the construction of the apparatus just described is not only well known, but will differ in some respects with the circumstances under which they are employed, and as they form no part of this invention, except as convenient accessories to produce the acid instead of purchasing the same, I have deemed it unnecessary to illustrate them in the accompanying drawings.

Figure 4:
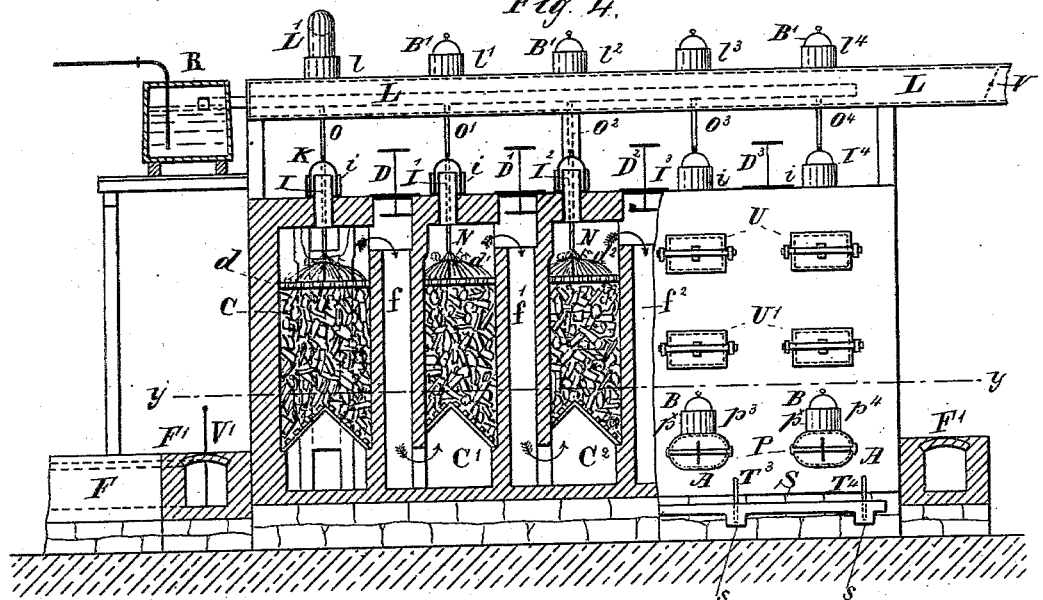

From the cooler or from a suitable reservoir the gases pass to the apparatus through a passage or flue, F, that branches to right and left and surrounds the apparatus or plant, the branch F' being provided with a valve, V', and the branch $F^2$ with a valve, $V^2$, said valves being shown in dotted lines in Figs. 1 and 3 and the former valve in full lines in Fig. 4.

The plant further comprises a battery or series of retorts or chambers, C to $C^9$, (of which I have shown ten in the accompanying drawings, though more or less may be employed,) which are lined or coated with a substance or material that is not affected by the gases; and, as an example, these chambers may be coated with a mixture of asphaltum and resin. The chambers C to $C^9$ communicate with one another by means of vertical passages or flues $f$ to $f^9$, and each of said passages has a valve or damper, D D' $D^2$ to $D^9$, respectively, whereby communication between one or more and the remaining chambers of the series may be cut off—that is to say, whereby any one or more of the chambers C to $C^9$ may be cut out of the circuit, as hereinafter more fully explained. Each chamber C to $C^9$ is provided with a grate of wood, $g$ to $g^9$, and a perforated diaphragm of like or other suitable material, $d$ to $d^9$. These chambers also have each a horizontally-projecting short pipe, P, that serves as a man-hole and gas-flue, it being closed at its outer end by a tight cover, A, and respectively provided with a short branch pipe, $p$ to $p^9$, inclusive, that projects vertically therefrom, and that is surrounded by a second short pipe, $p^x$, the annular space between the two serving as a receptacle for a liquid—as water, for instance. The branches of the flue F are provided with similar connections—namely, a vertically-projecting pipe, 1 to 9, respectively, surrounded by a second pipe, P'. The connecting-pipes $p$ to $p^9$ and 1 to 10 of the chambers C to $C^9$ and flue branches F' $F^2$ may be hermetically closed by means of bell-covers B and $b$, respectively, fitting over and around said pipes, the water contained in the receptacle between each two pipes forming a water seal or luting that prevents the escape of the gases. Either of the said chambers may be connected with the flue by means of a removable pipe, E, bent at both ends, which is simply placed over one of the pipes $p$ to $p^9$ and the corresponding flue-connection, and the escape of gases prevented by the water-luting.

As shown in Figs. 1 and 3, the valve $V^2$ of flue branch $F^2$ is closed and the valve V' of branch F' is open. The pipe E establishes the connection between the flue and the chamber C, the connections $p'$ to $p^9$, inclusive, and those 2 to 10, inclusive, being closed by their respective bell-covers, and all the dampers D to $D^8$ open, so that the gases arriving in F will pass around the apparatus or plant to the connection 1 of flue branch $F^2$, then through connection 1, pipe E, to and through connection $p$ and pipe P to chamber C, from the latter by flue $f$ to chamber C', thence through flue $f'$ to chamber $C^2$, and so on until the gases reach the chamber $C^9$ from flue $f^8$. Each chamber C to $C^9$ has at its upper end an outlet or discharge pipe, I to $I^9$, respectively, projecting above the upper chamber-wall, and is also surrounded by a second pipe, $i$, to form an annular receptacle for water, said discharge-pipes being closed by inverted bell-cover K when not connected with the discharge-flue. This connection with the discharge or suction flue or trunk L is effected by means of a pipe, L', bent at both ends in the same way as the lower end of the chambers are connected with the gas-flue, and as above clearly set forth, said pipe L' being readily removed when desired. The escape or discharge flue or trunk L is also provided with a number of water-sealed connections, $l$ to $l^4$, equal to one-half the number of chambers, and is located above the latter and between the two rows of chambers, said connections $l$ to $l^4$, except the one through which the gases or spent gases are discharged, being covered by bell-covers B'. By arranging the chambers in pairs or in two parallel rows, the chambers of one row being located immediately opposite those of the other row, and by locating the discharge-trunk between the two rows of chambers, I am enabled to use a single discharge trunk or flue, L, having but five connections, as the connections between the chambers and trunk may be made from opposite sides of the latter by means of the pipe L' by simply removing one of the bell-covers from the top of a chamber and the corresponding cover of the connection of the flue L, and placing the pipe L' in position. As shown in Fig. 1, all the connections of flue L are closed except $l$, and all the discharge-openings of the chambers except $I^9$, the valve or damper $D^9$ of flue $f^9$ being closed. The gases, after having traversed all the chambers, as above set forth, will escape at $l$ of chamber $C^9$, and through L' into the flue L. The pipe L' has a valve or damper, $V^3$, and the flue L has a valve or damper, V, the latter being shown in dotted lines in Figs. 1 and 4.

The operation of the apparatus is as follows: In the manufacture of glue from bones and the production of a solution of acid phosphate and acid sulphite, two of the chambers are charged with bones freed from fat, and the remaining chambers with carbonate of lime, (limestone,) the grates $g$ to $g^9$ of the chambers C to $C^9$ supporting the charges, and the perforated diaphragm $d$ to $d^9$ lying on the top thereof. To each diaphragm is fixed a dasher-disk, N, and each chamber C to $C^9$ is provided with a siphon feed-pipe, O to $O^9$, respectively connected with the main feed-pipes or gutters Q Q, that receive water from a reservoir, R, said pipes and reservoir being located above the chambers, as shown. The feed-pipes O to $O^9$ are bent in the form of a siphon or gooseneck, to form a water luting or seal to prevent the escape of gases, and are or may be provided with a stop-cock, if desired. As the gases pass through the material from the lower part of the chambers upward, as shown by the arrows, they act upon said material and meet the shower of water, the stream fed to each chamber falling on the dasher-disks, whereby they are more or less sprayed, and then upon the perforated diaphragms, that serve to equally distribute the water over the charge. The solution of acid phosphate and sulphite of lime obtained by the action of the sulphurous-acid gases upon the bones and lime charges trickles down into the lower part of the chambers and through siphon or other liquid-sealed pipes T to $T^9$, said solutions are discharged into receiving-gutters S. As shown in Figs. 2 and 4, the seal is here obtained by forming pockets $s$ in the gutters S, into which the discharge-pipes T to $T^9$ dip to prevent the escape of gases by forming a liquid seal, and in these gutters the two solutions are mixed and discharged therefrom into a reservoir, from which they are pumped back to the reservoir R until a solution of, say, about 5° Baumé has been obtained, when a fresh charge of water is passed through the chambers. When the phosphate of the bones has been eliminated, the remaining cartilage is withdrawn from the converters and manufactured into glue in the usual manner. The passage of the gases through the apparatus is effected by means of any suitable suction apparatus, pump, or blower. The spent gases, effectually deprived of their deleterious constituents, being discharged thereby, are returned to the source of supply, as hereinafter explained.

As it may happen that the contents of one or more of the series of chambers become exhausted sooner than the others, it is desirable that means should be provided to enable the operator to cut said chamber or chambers out of the gas-circuit. This may be readily done with the arrangement of circuit above described. Supposing, for instance, that the contents of chamber $C^3$ become exhausted, and that said contents should be removed and the chamber filled with fresh material. To cut this chamber out of the gas-circuit it will only be necessary, first, to close the stop-cock on the siphon-pipe $O^3$ and also the valve or damper $D^3$ of flue $f^3$, then to remove the pipe E and connect the chamber $C^4$ with the flue $F^2$ by means of the connections $p^4$ and 4, above described. The connections $p$ and 1 of chamber C being covered with their bell-covers B and $b$, the connecting-pipe $L'$ is now removed and the connections $I^9$ $l$ closed by bell-covers and the valve or damper $D^9$ opened. Finally, the damper $D^2$ is closed, and the upper part of chamber $C^2$ is connected with the discharge-flue L for the gases by means of the connections $I^2$ and the pipe $L'$. In this manner, it will be seen, any one or more of the chambers may be cut out of the gas-circuit, their contents removed through the man-holes or discharge-doors U U, with which each chamber is provided, and recharged and placed in the circuit again. The lower part of the chambers below the grates may be cleaned from time to time by means of the gas-pipes P. When several of the chambers are cut out of the gas-circuit at the same time, and to avoid the discharge of gases the sulphurous constituents of which have not been entirely absorbed by the material and water in the passage of such gases through the apparatus, I provide connections between the blower or other suction apparatus and the furnace and force said gases back again into the furnace in which they were originally generated. In fact, I prefer at all times to return the spent gases to the furnace in which they were first generated by blowing or forcing them into the fire-box.

In practice I employ two reservoirs for water, each containing a sufficient charge for the charges of the chambers, so that when the charge of one reservoir has been converted into a sufficiently concentrated solution of acid phosphate and acid sulphite of lime, I may at once feed the chambers from the other reservoir without interruption in the operation.

I have deemed it unnecessary to show in the drawings either the two reservoirs or the blower or suction apparatus, as these may be of any appropriate form or construction and of a capacity governed by the capacity of the apparatus.

When desired, the flow of the gases through the converters may be reversed by closing the damper or valve $V'$ of flue $F'$ and opening the damper or valve $V^2$ of flue $F^2$.

It will be seen that I thus obtain an apparatus the parts of which are limited to a minimum, and that is capable of a practically-continuous function without detrimental effect either upon the vegetation of the surroundings of the works or upon the health of the operatives or inhabitants in the vicinity of such works.

The described apparatus may also be applied to the production of sulphites generally or aqueous solutions of sulphurous acid, or for fertilizers.

In the manufacture of phosphates or sulphite of lime or other sulphites the chambers are filled with coke or other suitable porous bodies, and a solution of soda, for instance, or other suitable solution, is used instead of water, and a sulphite-of-soda solution is obtained; and for aqueous solutions of sulphurous acid water is again employed in conjunction with the coke.

When glue is to be the chief product, all the chambers are filled with comminuted bones previously freed from fat, and a transparent glue is obtained and a secondary product of a solution of acid phosphate and acid sulphite of lime. From the latter the sulphurous acid may be eliminated by well-known processes and used again in the apparatus.

If desired, the two solutions of acid phosphate of lime and acid sulphite of lime may be obtained separately when such solutions are the results of the treatment of carbonate of lime and bones separately, as above described, by providing means to conduct them into separate receivers.

Having now described my invention, what I claim, and desire to secure by Letters Patent, is—

1. The herein-described apparatus, consisting of a battery of converters connected with one another by flues, appliances for injecting a liquid into said converters, a duct common to the entire battery for admitting gas to, and a duct common to the entire battery for receiving the spent gases from the converters of the battery, said ducts being arranged to form a continuous circuit from the converter that receives the gas to the converter from which the spent gases are discharged, in combination with appliances for cutting any one or more of the converters out of the circuit without destroying the continuity thereof through the remaining converters or allowing the gases or liquid to escape, as described, for the purposes specified.

2. The combination, with a battery of converters connected with one another by ducts or flues, valves or dampers for cutting off the connection between any two converters, feed and discharge connections consisting of a short pipe contained within a liquid-receptacle, and a cover adapted to inclose said short pipe and be inclosed by the liquid-receptacle thereof, of a feed and a discharge duct or flue common to all the converters, and provided with like connections and covers therefor, one for each converter, and of pipes whereby any one of said converters may be placed in direct communication with the feed or discharge duct by removal of the covers from their respective and corresponding connections and substitution of said pipe or pipes, the ends of the latter being arranged to inclose the short pipe and be inclosed by the liquid-receptacle of the connections, substantially as described, for the purposes specified.

3. In an apparatus or plant of the class described, the combination of a battery of converters connected in circuit by ducts or flues, a source of supply for supplying gas to the converters at the initial of the circuit, a duct or flue for receiving the gas at the terminal of said circuit, appliances for feeding a liquid into the converters, and appliances for returning the liquid and gas to their respective sources of supply, substantially as described, for the purposes set forth.

4. In an apparatus or plant of the class described, the combination of a battery of converters connected in circuit by ducts or flues, a source of supply for supplying gas to the converters at the initial of the circuit, a duct or flue for receiving the gas at the terminal of said circuit, appliances for feeding a liquid into the converters, appliances for returning the liquid and gas to their respective sources of supply, and appliances for cutting any one or more of the converters out of the circuit without destroying its continuity or the return of the liquid or gas to said sources of supply, as described, for the purposes specified.

5. The combination, with the converters C C' $C^2$, &c., their ducts or flues $f f' f^2$, &c., the pipes P, having connections $p p'$, and the connections I I' $I^2$, &c., of the branched duct or flue F F' $F^2$, the duct L, the pipes E L', and the covers B $b'$ B' K, substantially as described, for the purposes set forth.

6. The combination, with the converters C C' $C^2$, &c., their ducts or flues $f f' f^2$, &c., the pipes P, the connections I I' $I^2$, &c., and the valves or dampers D D' $D^2$, &c., of the ducts or flues F F' $F^2$ L, the covers B $b$ B', and the pipes E L', arranged for operation substantially as described, for the purposes set forth.

7. The combination, with the converters C C' $C^2$, &c., their ducts $f f' f^2$, &c., the pipes P, the connections I I' $I^2$, &c., the dampers D D' $D^2$, &c., and appliances for feeding a liquid to each of the converters and for stopping said feed, of the ducts F F' $F^2$ L, the pipes E L', and the bell-covers B $b$ B', substantially as described, for the purpose specified.

8. The combination, with the converters C C' $C^2$, &c., their ducts $f f' f^2$, &c., the pipes P, the ducts F F' $F^2$ L, the pipes E L' and O O' $O^2$, &c., and means for feeding a liquid to and spraying the same in said converters, of the bell-covers B $b$ B' K, the pipes T T' $T^2$, &c., and suitable means for returning the liquid and gases to their respective sources of supply, substantially as described, for the purposes specified.

In testimony whereof I affix my signature in presence of two witnesses.

CARL WALDEMAR FLODQUIST.

Witnesses:
NERE A. ELFWING,
ERNST SVANQVIST.